United States Patent [19]

Alton

[11] Patent Number: 4,521,771
[45] Date of Patent: Jun. 4, 1985

[54] COMBINED STATIC AND DYNAMIC IMAGE DATA DISPLAY SYSTEM

[75] Inventor: Michael J. Alton, Cupertino, Calif.

[73] Assignee: Omni Devices, Inc., Sunnyvale, Calif.

[21] Appl. No.: 352,033

[22] Filed: Feb. 24, 1982

Related U.S. Application Data

[63] Continuation-in-part of Ser. No. 100,705, Dec. 4, 1979, abandoned.

[51] Int. Cl.³ .................... G09G 3/00; G09G 3/36
[52] U.S. Cl. ............................ 340/705; 340/712; 340/815.31; 340/716; 340/365 VL
[58] Field of Search .............. 340/710, 712, 716, 765, 340/784, 705, 815.31, 365 P, 365 VL, 793, 812

[56] References Cited

U.S. PATENT DOCUMENTS

| 3,576,364 | 4/1971 | Zanoni | 340/716 |
| 3,744,878 | 7/1973 | Kiemle et al. | 340/784 |
| 3,750,136 | 7/1973 | Roess | 340/784 |
| 3,815,986 | 6/1974 | Darbee | 340/815.31 |
| 3,885,096 | 5/1975 | Inuiya et al. | 340/705 |
| 3,899,786 | 8/1975 | Greubel et al. | 340/784 |
| 4,263,594 | 4/1981 | Masucci | 340/815.31 |
| 4,349,817 | 9/1982 | Hoffman et al. | 340/784 |
| 4,379,290 | 4/1983 | Muggli et al. | 340/815.31 |

Primary Examiner—Marshall M. Curtis
Attorney, Agent, or Firm—Clarence A. O'Brien; Harvey B. Jacobson

[57] ABSTRACT

Illuminating light from a plurality of light bulbs is converged into a collimated beam by a coalescing optical fiber bundle to extract images from dynamic and static data sources positioned along the optical axis of the beam. A beam splitter transmits the combined images to a display screen through a folded projection fiber bundle and to sensors for extraction of image signals fed as inputs to a computer controlling image changes in the static data source, scanning operation of the dynamic data source, and light intensity and color of the illuminating light.

17 Claims, 4 Drawing Figures

COMBINED STATIC AND DYNAMIC IMAGE DATA DISPLAY SYSTEM

CROSS-REFERENCE TO RELATED APPLICATION

This application is a continuation-in-part of my prior copending application Ser. No. 100,705, filed Dec. 4, 1979, now abandoned, the disclosure of which is incorporated herein by reference.

BACKGROUND OF THE INVENTION

This invention relates in general to visual display of computer generated dynamic optical data combined with static optical data such as that provided by microfilm.

An optical display system of the foregoing type is disclosed in U.S. Pat. No. 3,885,096 to Inuiya. Aside from the costliness of the system shown in the Inuiya patent, it is subject to excessive image distortion because of separate and independent image magnification of dynamic optical data from a CRT source before such data is combined with static image data from a film source for projection onto a display screen. Also, under certain high ambient light conditions, display "washout" will occur making viewing difficult as well as to create an optical signal feedback or "readback" problem interferring with data input to the computer through which the data sources are controlled.

According to the system disclosed in my copending application, aforementioned, some of the problems associated with the prior art are minimized by combining images from the dynamic and static data sources before magnification so that only a combined image is magnified and projected toward the display screen. Further, the optical focal length is shortened without introducing parallax by use of a optical fiber bundles. By introducing dynamic and static optical image inputs to a data independent illuminating light beam along a common optical axis, the dynamic image source not only functions to provide an image input but also performs a scanning action with respect to the static image.

An important object of the present invention is to improve scan accuracy and image resolution of the system and reduce "washout" resulting from high ambient light conditions. Further, another object is to provide a readback capability that is more efficient and less costly than that associated with prior art arrangements.

In accordance with the foregoing objectives, it is a more specific object of the present invention to provide an optical data display system for consumer use in very demanding installations such as automotive map display.

SUMMARY OF THE INVENTION

In accordance with the present invention, a data independent source of illuminating light is generated by a plurality of light bulbs that are heat sinked. The light from such bulbs is converted into a relatively narrow beam of collimated light by a coalescing optical fiber bundle. The light beam is directed along a common optical axis with sufficient light intensity to project images from a static data source in the form of a film that is displacable in three directions under computer control through a drive arrangement. Dynamic optical data is combined with the film recorded image by the light beam extending through a light blocking type of dynamic image data source in the form of a liquid crystal display (LCD) matrix. This dynamic source is positioned along the common optical axis close to the static data source so as to perform an image scanning action under computer control with respect to the image extracted from the static data source or film. The image scan resolution, otherwise limited by the dot size of the LCD matrix, is improved through computer control by use of an optical fiber bundle and photocell sensor array aligned with the common optical axis, the fiber bundle having closely spaced fiber ends receiving the film image.

Most of the light beam carrying the combined image data derived from the static and dynamic data sources is reflected through a beam splitter and transmitted through a projection fiber bundle to a magnifying lens plate adjacent to a display screen. Widely spaced fiber ends of the projection fiber bundle are intertwined with input fiber ends of a readback fiber, bundle receiving segments of the image reflected from corresponding surface segments on the display screen onto which image segments are projected from the fiber ends of the projection fiber bundle. Readback information transmitted through the readback fiber bundle is received by the photocell sensor array aforementioned for signal interfacing with the computer through which control over the data sources and the illuminating light sources is exercised.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENT

Figure 1:
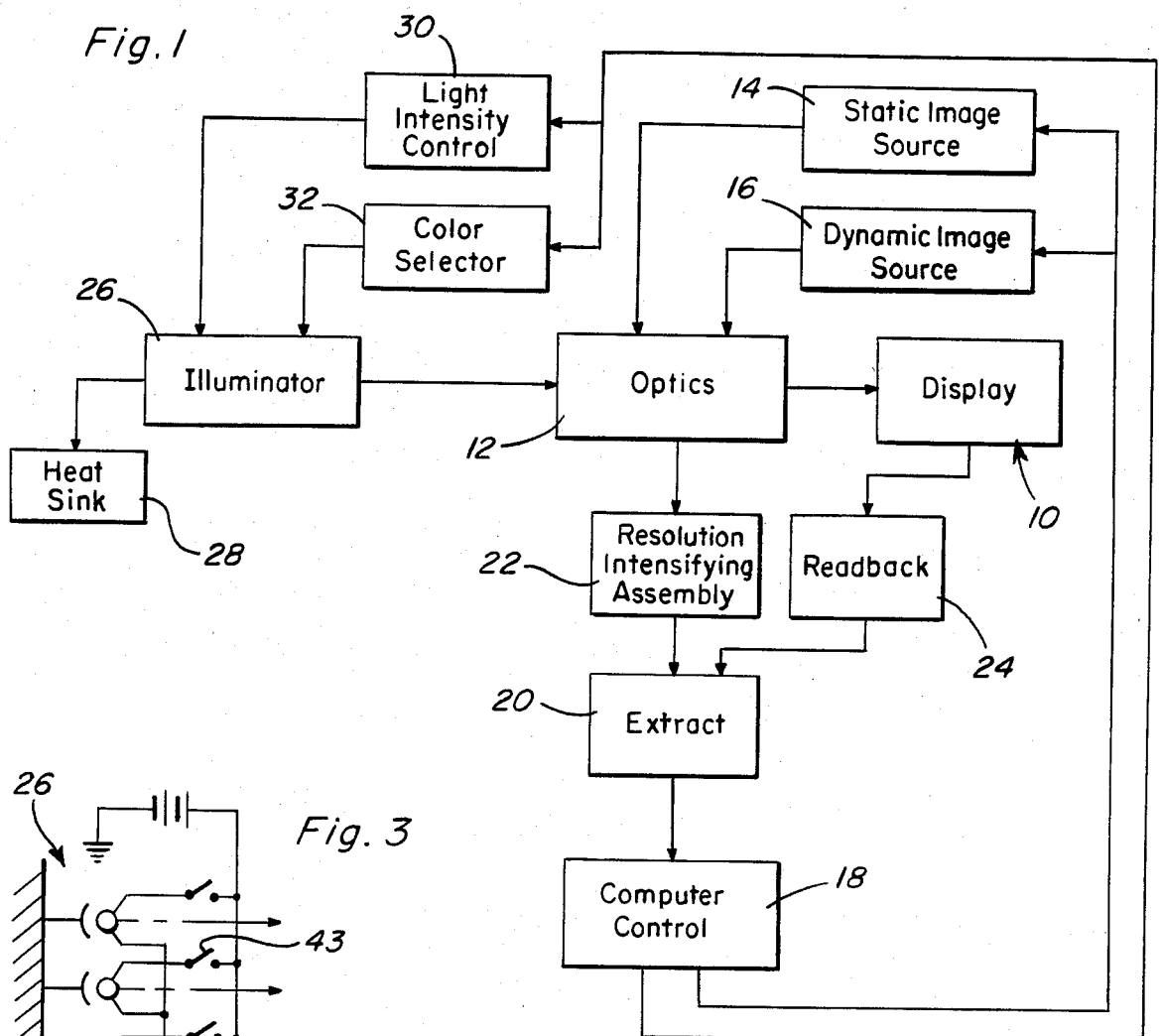
FIG. 1 is a schematic block diagram illustrating the system of the present invention.

Referring now to the drawings in detail, FIG. 1 illustrates the system with which the present invention is associated whereby information is visually displayed on a display screen 10 through optics 12 to which image information is fed from static and dynamic sources 14 and 16. Image changing and image scanning and other control functions performed with respect to the sources 14 and 16 is controlled by a computer component 18 receiving data inputs derived from the optics 12 through optical data extract sensor 20, resolution compensating assembly 22 and a readback component 24. The nature of such computer data inputs will be explained in detail hereinafter. The transmission of image information from sources 14 and 16 through the optics 12 is rendered operative by an illuminator 26 that is data independent and has a heat sink 28 associated therewith. The output of the illuminator 26 is controlled by the computer through a light intensity control 30 and a color selector 32.

Figure 3:
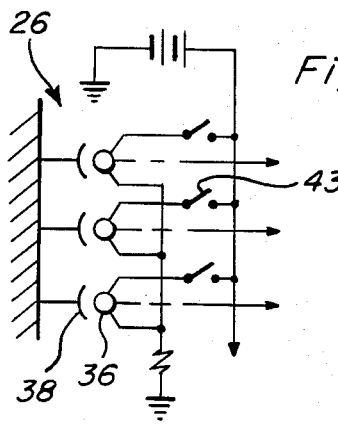
FIG. 3 is a simplified schematic diagram of the illuminating light source associated with the system.
Figure 2:
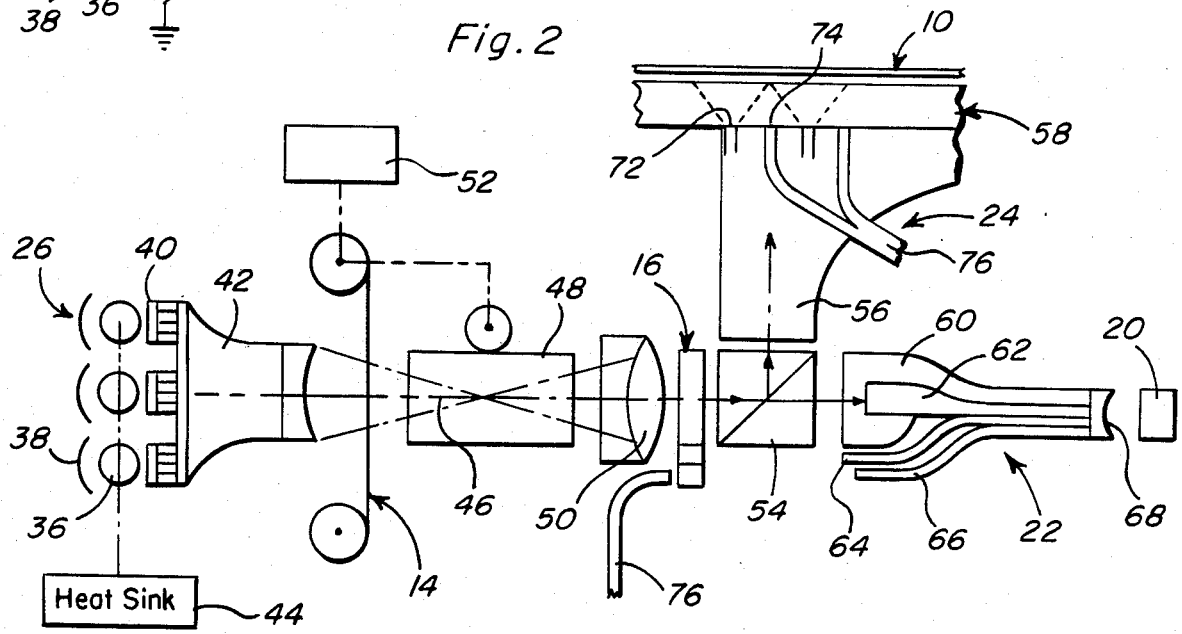
FIG. 2 is a simplified optical diagram of the optical arrangement associated with the system shown in FIG. 1.

The optics 12 is diagrammed in FIG. 2, showing the light inputs of the illuminator 26 in the form of spaced lamps having light bulbs 36, heat sinked through a chassis 44, and reflectors 38. An optical filter 40 is interposed between each lamp and a fiber optic collector bundle 42 transmitting its input light thereto. The filter 40 associated with each of the lamps limits the light input to one particular color so that the light inputs have different colors. With all of the light inputs on, the total light produced is white. Color selection is effected by selector 32 including switches 43 as shown in FIG. 3, turning off selected light bulbs. Light intensity may be changed by a frequency/time varying on-off type of control 30 for the selectively operated switches 43 as diagrammed in FIG. 1.

The light transmitted by the fibers of the collector bundle 42 is collimated into a beam along a common optical axis 46 as shown in FIG. 2, and passes in sequence through a film frame of the static image source 14, a zoom lens 48, a projection lens 50 and the dynamic image source 16 in the form of a liquid crystal display (LCD) matrix. Movement of the film is effected in plural directions by a film transport drive 52. The inmage beam is focused by the zoom lens 48. Computer control over the source 16 is exercised by causing blockage or passage of light through selected elements of the LCD matrix to mask all but specific areas of interest on the film as well as to perform other functions. Drive signals from the computer control 18 fed to the motors of the film drive 52 effect movement of the film in directions along and perpendicular to the optical axis 46 and adjust the zoom lens 48 along the axis 46 to introduce a magnification effect.

A combined image is presented by the image beam passing through the LCD matrix of data source 16 to a beam splitter assembly 54, from which the beam is reflected along the optical projection fibers of a fiber bundle 56 arranged to maintain image coherency. The combined image transmitted by fiber bundle 56 is magnified by a lens plate 58 adjacent to the display screen 10. The lens plate 58 to which the fiber ends of bundle 56 are connected, is shown in detail in my prior copending application aforementioned.

As also shown in FIG. 2, a portion of the pictorial image transmitted from film source 14 to projection fiber bundle 56 by the beam splitter 54 is scanned by a bundle of scan fibers 60 while a scan fiber bundle 62 scans a portion of the combined image centered by the LCD matrix 16. Other images from the LCD matrix 16 are scanned by fibers 64 and 66. All of the scanning fibers transmit light through a prism 68 forming part of the resolution compensating fiber assembly 22 to which the data extract sensor 20 responds. The sensor 20 is in the form of a linear photo-cell array.

Figure 4:
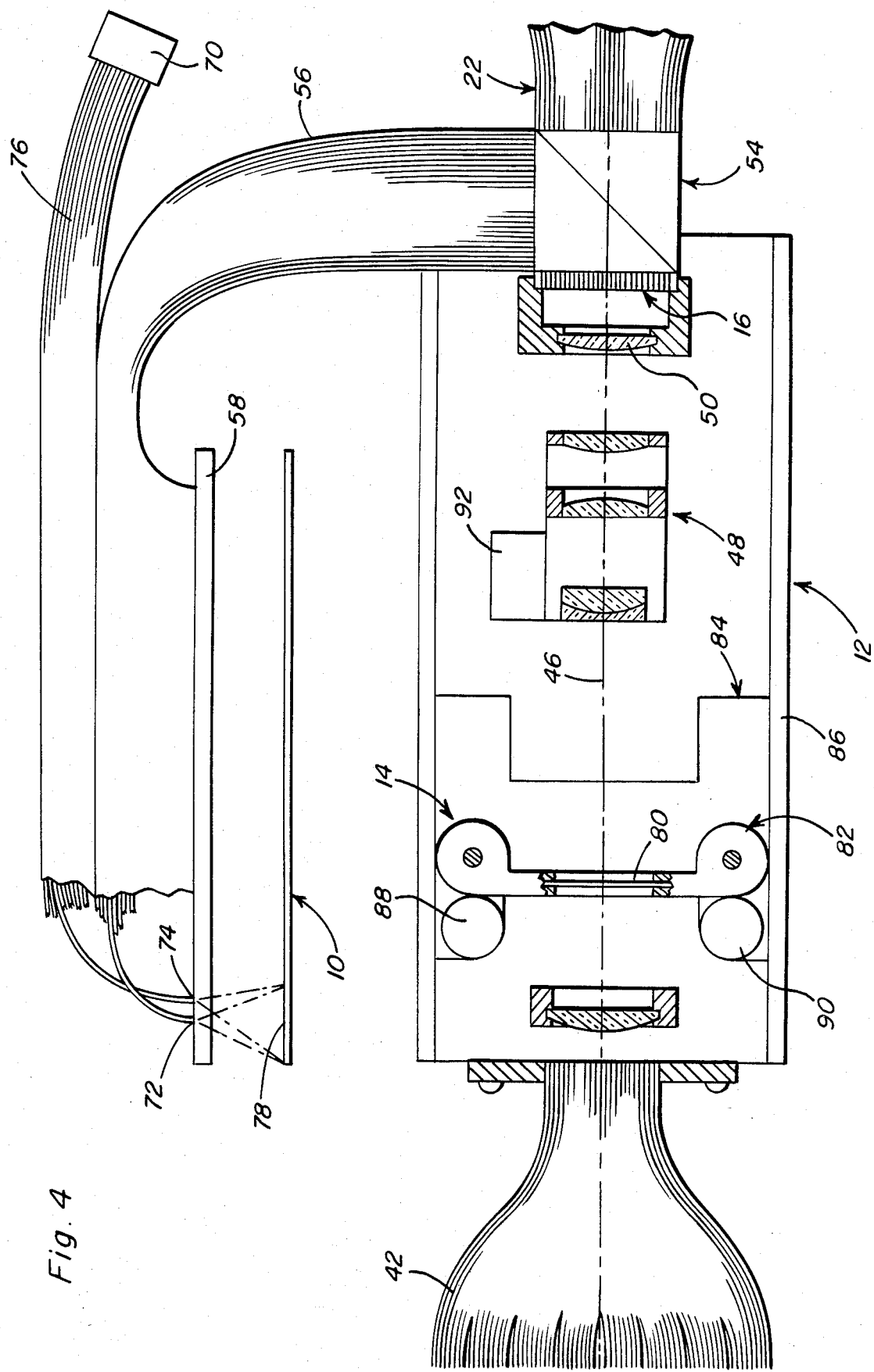
FIG. 4 is a simplified side section view of the optical arrangement diagrammed in FIG. 2.

Referring now to FIGS. 2 and 4, the fibers of projection fiber bundle 56 at the output ends 72 are intertwined with the input ends 74 of fibers in the readback fiber bundle 24 having output ends positioned adjacent the LCD matrix 16 for scanning by fibers 66. The fibers 76 of bundle 24 transmit ambient and/or light reflected from the same surface segments 78 of the display screen to which light is transmitted by corresponding projection fibers of bundle 56. The sensor array 20 will therefore supply light intensity signal inputs to the computer control 18 that vary as a function of the ambient light conditions on the display screen as well as the compensating data inputs from the scan fibers 60, 62 and 64. Corrective control signals may thereby be generated by the computer to vary the light intensity of the illuminator 26 through control 30.

With reference to FIG. 4, the collector fiber bundle 42 may be constructed simply as an assembly of parallel fibers with a separate lens affixed to provide the condensing action necessary to focus the common light beam in accordance with system requirements. Alternatively, the individual fibers of bundle 42 may be bundled in a converging pattern to both collimate and condense the light into the common beam. The static film data applied to the common beam is scanned by the resolution compensating assembly 22 for a film scan operation. The fibers of fiber bundle 56 affixed at the larger output ends 72 to the lens plate 58 project the enlarged image segments 78 onto one side of the display screen 10 opposite the viewing side to recombine the original images into an enlarged reproduction of the film image and also accommodate readback through fiber bundle 76. The sensor array 20 is formed by photocells aligned with the fiber ends of the resolution compensating fiber bundle assembly 22.

The film 80 associated with the static image source 14 as shown in FIG. 4 is mounted within a conventional type film cartridge 82 carried on a film carriage 84. The film winding action of the cartridge produces film movement along the X axis while displacement of the cartridge 84 relative to the frame 86 produces movement along a Y axis perpendicular to the X axis. The zoom lens 48 is motorized to change focal length by movement along the Z axis 46. Conventional step motors 88, 90 and 92 as diagrammatically shown in FIG. 4 may be utilized to effect such movements under computer command.

It will be observed from FIG. 4 that the arrangement of the present invention does not include the usual heat dissipating means, such as a blower fan and the space requirements imposed thereby. Instead, the light intensity requirement for image projection from the film is met by use of the plurality of small light bulbs 36 distributed over a relatively large area and heat sinked as hereinbefore described with respect to FIG. 2. By use of the fiber bundle 42, the illuminating light from bulbs 36 may be concentrated into a narrow beam. Further, through use of a plurality of small bulbs 36, color control may be readily effected by means of the computer interfaced control 32. For example, an optimum quantity of light bulbs 36 may be used and by use of filters 40, one green bulb, two red bulbs and five blue bulbs may be placed in a balanced arrangement satisfying a convenient eight bit computer program. The light from each bulb transmitted by the fibers of bundle 42 will experience a very small loss and bulb failure will merely degrade system performance until the bulb is replaced, without total system shutdown.

High scan resolution according to the present state of the art is not possible with the LCD matrix source 16. Thus, high resolution scan of image features as fine as that recorded on the film of static source 14, cannot be ordinarily achieved by the dot sizes of the LCD matrix. For this reason, the resolution compensating assembly 22 is aligned with the optical axis 46 extending through both LCD matrix 16 and the film 80 of source 14 to present a matrix of optical fibers for image transmission more closely spaced than the dots of the LCD matrix 16. These fibers are presented to the photocells in sensor array 20. The number of fibers and photocells will depend on the degree to which scan resolution is to be improved.

By way of example, the system hereinbefore described may be utilized to locate and track a given feature within a static data film frame, such as a highway on a map. Binary coding previously read from another film segment and stored in the computer memory provides data on the highway such as its code color (red), its line width, starting coordinates, direction and length. The computer commands the illuminator 26 through color selector 32 to provide the complement of red, and in connection with the static image source 14, commands the transport device 52 to position film 80 at the starting coordinates. Commands to the zoom lens motor 92 also provide maximum magnification. Also, under computer command, the LCD matrix 16 subdivides the image by the number of elements therein and transmits only the image portion of interest through resolution compensating fiber bundles 22 to the sensor array 20 for pixel transposition causing a further subdivision in the high resolution scanning action. The sensor array 20 will detect the image pixels denoting the highway feature as being dark with all other map portions receiving light since the red line image formed will block the illuminating light. Having identified the starting location on the actual projected image within the matrix of sensor 20, tracking is performed by repositioning the film 80 under computer commands effecting additional scans. The LCD matrix also provides a dynamic indicator. The indicator denotes current location of an automative vehicle, for example, on a map during an operator display mode and such position is updated in response to odometer and compass inputs where the system is installed in a map display installation in the vehicle.

With reference to FIG. 1, the lamps 36 will be pulsed through the electronic drivers in parallel at some given duty cycle to regulate intensity through component 30 under computer control 18 which will also command operation of the color selector 32 through which selected lamps 36 are enabled for color selection purposes. Since the fibers in bundle 42 are intertwined, the output beam will have homogeneous color and intensity. Such an arrangement will be advantageous for the automative map display installation as well as other applications.

The readback component 24 hereinbefore described operates to sense the location on the screen 10 at which it is contacted by an operator's finger, for example, useful in a menu display system. In such a system, optical multiplexing limits detection by the sensor array 20 to readback data under computer control. In a map display system, a given route may be traced by the operator using a finger or pointer in contact with the screen.

It will be apparent from the foregoing description, that the present invention has a unique multifunction character. These functions include static data display, dynamic data display, dynamic data overlay on static data, film scan, and readback from the screen. For static data display the illumination system described provides illumination with selected color and/or intensity. The film transport 52 positions the static data on film source 14 for display as a magnified image on screen 10. Then lens system 48 allows zoom control while the LCD matrix 16 modulates the illumination for highlighting purposes. The LCD matrix 16 provides the output for dynamic data display under computer control. Image magnification for both static and dynamic data display is effected through the projection fiber bundle 56.

The film transport 52 positions the film for the film scan function while the zoom lens 48 increases scan resolution. The LCD matrix 16 masks static data to areas of interest to allow optical multiplexing through the resolution compensating fibers of assembly 22 which also perform a pixel transposition function. The image pixels in such action of the resolution compensating fibers are detected by the photocell sensor array 20 for signal interfacing with the computer.

The sensor array 70 as shown in FIG. 4 detects only readback pixels from readback fibers 76 in the readback operation of the system wherein, the screen 10 provides a touch reflect/non-reflect surface. For this function, the LCD matrix 16 masks illumination to allow optical multiplexing, while the illumination itself provides for reflective sensing at the screen.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a visual display data-independent system having a source of image data, a display screen, a source of illumination from which a light beam is emitted to transmit images from the data source to the display screen, sensing means for extracting optical data from said light beam, and computer means interfaced with the sensing means for controlling operation of the source of image data, said image data source including a static film and a LCD matrix through which the light beam passes in sequence along a common optical axis, the improvement comprising optical fiber means operatively positioned relative to said source of illumination for receiving said light beam along said common optical axis extending through the source of image data, means for projecting said images, transmitted by the light beam along said common optical axis, to said display screen, means for transmitting portions of said images to the sensing means independently of said projection of the images to the display screen, said LCD matrix having image transmitting dots with predetermined spacing therebetween less than the image resolution of the static film, including resolution compensating optical fiber means operatively positioned along said common optical axis between the LCD matrix and the sensing means, said resolution compensating optical fiber means including a matrix of optical fibers more closely spaced than said predetermined spacing between the image transmitting dots of the LCD matrix, whereby scanning of images formed by the static film through the LCD matrix and the sensing means is performed at resolutions comparable to said image resolution of the static film.

2. The improvement as defined in claim 1 wherein said projecting means includes a projection lens, a beam splitter, means mounting the projection lens and the beam splitter in spaced alignment along the common optical axis for reflecting the light beam toward the display screen, and fiber bundle means through which the reflected light beam is transmitted to the display screen for coherent image display thereon.

3. The improvement as defined in claim 2 wherein said fiber bundle means includes optical fibers having input and output ends, means mounting the input ends of the fibers in relatively close spaced relation and operatively aligned with the beam splitter for receiving the reflected beam therefrom, and means mounting the output ends of the fibers in more widely spaced relation and operatively positioned relative to the display screen for directing the reflected beam thereon.

4. The improvement as defined in claim 3 including passive optical readback means positioned adjacent to the display screen for detecting variations in light conditions on the display screen.

5. The improvement as defined in claim 4 wherein said readback means includes a fiber bundle having input ends intertwined with the output ends of the fiber bundle means and output ends spaced from the display screen, and readback sensor means operatively aligned with the output ends of the readback fiber bundle and connected to the computer means for generating corrective signals.

6. The improvement as defined in claim 5 including light intensity control means connected to said source of illumination for varying the light intensity of the light beam in response to said corrective signals.

7. The improvement as defined in claim 6 wherein said source of illumination includes a plurality of spaced light bulbs, said optical fiber means comprising a light collecting fiber bundle having a relatively small output end aligned with the common optical axis from which the light beam emerges in collimated form and a relatively large input end operatively aligned with said plurality of spaced light bulbs.

8. The improvement as defined in claim 1 including passive optical readback means positioned adjacent to the display screen and operatively connected to the sensing means for supply of data inputs to the computer means.

9. The improvement as defined in claim 8 wherein said readback means includes a fiber bundle having input ends receiving reflected light from the display screen and output ends spaced from the display screen, and readback sensor means detecting the output of the readback fiber bundle and connected to the computer means for supply of input data thereto.

10. The improvement as defined in claim 9 including light intensity control means connected to said source of illumination for varying the light intensity of light beam to enhance said detection by the readback sensor means.

11. The improvement as defined in claim 10 wherein said source of illumination includes a plurality of spaced light bulbs, said optical fiber means comprising a light collecting fiber bundle having a relatively small output end aligned with the common optical axis from which the light beam emerges in collimated form and a relatively large input end operatively aligned with said plurality of spaced light bulbs.

12. The improvement as defined in claim 1 wherein said source of illumination includes a plurality of spaced light bulbs, said optical fiber means comprising a light collecting fiber bundle having a relatively small output end aligned with the common optical axis from which the light beam emerges in collimated form and a relatively large input end operatively aligned with said plurality of spaced light bulbs.

13. The combination of claim 1 including means interfacing the computer means with the LCD matrix for overlaying the images formed by the film with dynamic information.

14. The combination of claim 1 including zoom lens means operatively positioned between the film and the LCD matrix for magnifying the images formed by the film with maximum film data density.

15. The combination of claim 1 wherein the image data source further includes transport means for positioning the film under command of the computer means.

16. The improvement as defined in claim 15 including zoom lens means operatively positioned between the film and the LCD matrix for magnifying the images formed by the film with maximum film data density.

17. The improvement as defined in claim 16 wherein said means for transmitting portions of said images further includes additional fiber bundles transmitting signals through the sensing means to the computer means for control of the transport means and the zoom lens means.

* * * * *